United States Patent
Semsey (10) Patent No.: US 9,513,133 B2
(45) Date of Patent: Dec. 6, 2016

(54) SYSTEM FOR PARKING TIME MANAGEMENT

(71) Applicant: CONTINENTAL AUTOMOTIVE GMBH, Hannover (DE)

(72) Inventor: Akos Semsey, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/654,343

(22) PCT Filed: Dec. 2, 2013

(86) PCT No.: PCT/EP2013/075230
§ 371 (c)(1),
(2) Date: Jun. 19, 2015

(87) PCT Pub. No.: WO2014/095327
PCT Pub. Date: Jun. 26, 2014

(65) Prior Publication Data
US 2015/0345965 A1 Dec. 3, 2015

(30) Foreign Application Priority Data
Dec. 21, 2012 (DE) .................. 10 2012 224 149

(51) Int. Cl.
*G01C 21/34* (2006.01)
*H04W 12/06* (2009.01)
(Continued)

(52) U.S. Cl.
CPC ........... *G01C 21/3438* (2013.01); *G07B 15/02* (2013.01); *G08G 1/143* (2013.01);
(Continued)

(58) Field of Classification Search
CPC ...... G07B 15/02; G08G 1/143; G08G 1/146; G08G 1/147; G08G 1/205; H04W 4/008; H04W 84/12; H04W 12/06; G01C 21/3438
USPC .......................................... 701/537; 370/338
See application file for complete search history.

(56) References Cited

U.S. PATENT DOCUMENTS 6,694,259 B2 * 2/2004 Curbow ................. G01C 21/26
340/468
6,988,034 B1 1/2006 Marlatt et al.
(Continued)

FOREIGN PATENT DOCUMENTS

DE 10009057 A1 8/2001
DE 10 2006 042 358 3/2008
(Continued)

OTHER PUBLICATIONS

Continental: Sesam öffne dich: Mit Continental warden Handys zu cleveren Autoschlüsseln. Pressemitteilung Nov. 13, 2011, (6 pages).
(Continued)

*Primary Examiner* — Atul Trivedi
(74) *Attorney, Agent, or Firm* — Cozen O'Connor (57) ABSTRACT

A system for selective opening of a vehicle includes: a first communications module establishing, via a communications network, a communication link to a service provider of authorization data; a first identification routine for unambiguous identification of the service provider; a second communications module establishing a wireless communication network link to a control device for access arrangement of a vehicle; a second identification routine unambiguously identifying the system by the access arrangement; and a third communications module receiving update request information from the driver and an authorization data update routine. By the second communications module, the control device receives a profiled control signal that causes a selective opening of the vehicle via the control device if valid authorization data is available.

6 Claims, 2 Drawing Sheets

(51) Int. Cl.
*H04W 4/00* (2009.01)
*H04W 84/12* (2009.01)
*G07B 15/02* (2011.01)
*G08G 1/14* (2006.01)
*G08G 1/00* (2006.01)

(52) U.S. Cl.
CPC ............. *G08G 1/146* (2013.01); *G08G 1/147* (2013.01); *G08G 1/205* (2013.01); *H04W 4/008* (2013.01); *H04W 12/06* (2013.01); *H04W 84/12* (2013.01)

(56) References Cited

U.S. PATENT DOCUMENTS

| | | | | |
|---|---|---|---|---|
| 8,843,307 | B1* | 9/2014 | Kolodziej | G01C 21/3685 340/932.2 |
| 2004/0243426 | A1 | 12/2004 | Hashimoto | |
| 2005/0280555 | A1* | 12/2005 | Warner, IV | G08G 1/14 340/932.2 |
| 2006/0049921 | A1 | 3/2006 | Hara et al. | |
| 2008/0066186 | A1 | 3/2008 | Hammes | |
| 2008/0136674 | A1 | 6/2008 | Jang | |
| 2010/0305779 | A1* | 12/2010 | Hassan | G01C 17/38 701/2 |
| 2011/0112969 | A1 | 5/2011 | Zaid et al. | |
| 2011/0131154 | A1 | 6/2011 | Faber et al. | |
| 2011/0249658 | A1* | 10/2011 | Wohlert | H04W 4/04 370/338 |
| 2012/0056758 | A1* | 3/2012 | Kuhlman | G08G 1/14 340/932.2 |
| 2012/0092190 | A1* | 4/2012 | Stefik | G06Q 10/02 340/932.2 |
| 2012/0127308 | A1* | 5/2012 | Eldershaw | G08G 1/147 348/143 |
| 2012/0203600 | A1 | 8/2012 | Fiorucci et al. | |
| 2013/0135118 | A1* | 5/2013 | Ricci | G06F 9/54 340/932.2 |
| 2013/0179061 | A1* | 7/2013 | Gadh | B60L 11/1842 701/123 |
| 2014/0306833 | A1* | 10/2014 | Ricci | B60Q 1/00 340/901 |
| 2015/0061895 | A1* | 3/2015 | Ricci | H04W 4/22 340/902 |
| 2016/0025503 | A1* | 1/2016 | Kees | G08G 1/144 701/400 |
| 2016/0063863 | A1* | 3/2016 | Stefik | G06Q 10/02 340/932.2 |

FOREIGN PATENT DOCUMENTS

| | | |
|---|---|---|
| DE | 102007042412 A1 | 3/2009 |
| EP | 1 564 690 | 8/2005 |
| WO | WO 2010/010314 | 1/2010 |

OTHER PUBLICATIONS

Office Action dated Sep. 8, 2016 which issued in US Patent Application No. 14/367,799.

* cited by examiner

SYSTEM FOR PARKING TIME MANAGEMENT

CROSS-REFERENCE TO RELATED APPLICATIONS

This is a U.S. national stage of application No. PCT/EP2013/075230, filed on 2 Dec. 2013, which claims priority to the German Application No. DE 10 2012 224 149.3 filed 21 Dec. 2012, the content of both incorporated herein by reference.

BACKGROUND OF THE INVENTION

1. Field of the Invention

The present invention relates to a system for parking time management.

2. Related Art

US 2006 0 049 921 A1 describes the transmission of the usage schedule of a vehicle, including the destinations and the residence time for a relatively long time period, such as one week, to a security service center. The planning is carried out by a PC or an organizer. This planning is carried out, in this case, in order to monitor the vehicle and set security levels of the vehicle.

In order to enable an automobile to be accessed by delivery services, the parking times and parking locations must be planned, at least partially, and the delivery service must be notified of the likely parking time so that the delivery services can logistically plan and bundle the deliveries.

SUMMARY OF THE INVENTION

An object of the invention is to ensure that the delivery service knows the parking location of the relevant vehicle before the delivery, thereby enabling deliveries and service work to be carried out at the site of the vehicle without participation by the vehicle owner, but with permission from said vehicle owner.

A first advantageous embodiment of the system for the parking time management of a vehicle comprises a first communications module for establishing a communication link to a communication terminal unit of a service provider of the authorization data via a communications network, a first identification routine for the unambiguous identification of a service provider, a second communications module for establishing a communication link via a wireless communications network to a communication device of a control device for the access arrangement of a vehicle, a second identification routine for the unambiguous identification of the system by the access arrangement, a third communications module for receiving update request information from the driver, and an updating routine for updating authorization data in a memory of the system, wherein a communication link to a service provider is established via the second communications module for establishing a communication link via a wireless communications network by a navigation device of the vehicle, which is located in the vehicle, wherein the establishment of the communication link is controlled by the navigation device, and a route plan stored by the driver in the navigation device in the vehicle is transmitted to the service provider via the communication link.

Another advantageous embodiment of the system according to the invention is characterized in that the navigation device is integrated into a driver assistance system.

Another advantageous embodiment of the system according to the invention is characterized in that the navigation device is a mobile navigation device, which controls the second communications module via near field communication.

Another advantageous embodiment of the system according to the invention comprises establishing a communication link via the wireless communications network by a mobile radio communications network.

Another advantageous embodiment of the system according to the invention is characterized in that, in the route planning, the navigation system determines the dwell time in parking spaces in advance by a query routine and, if the dwell time is suitable, activation takes place to establish a communication link.

Another advantageous embodiment of the system according to the invention is characterized in that an encryptor is provided for encrypting the communication between the communication device of the system and the navigation system by the use of a shared secret.

In the most favorable case, a delivery service can advantageously make deliveries to a plurality of vehicles in company parking lots, commuter parking lots, and P+R parking lots. It is thereby possible to minimize the amount of effort expended and the associated environmental impact.

In another embodiment of the system according to the invention, system comprises a first communications module for establishing a communication link to a communication terminal unit of a service provider of the authorization data via a communications network, a first identification routine for the unambiguous identification of a service provider, a second communications module for establishing a communication link via a wireless communications network to a communication device of a control device for the access arrangement of a vehicle, a second identification routine for the unambiguous identification of the system by the access arrangement, a third communications module for receiving update request information from the driver, and an updating routine for updating authorization data in a memory of the system, wherein, by the second communications module for establishing a communication link via a wireless communications network to a communication device of the control device for the access arrangement of a vehicle, the control device receives a profiled control signal via the communication link that initiates a selective opening of the vehicle via the control device if valid authorization data are available.

In another embodiment of the system according to the invention, the selective opening initiates the opening of the engine hood of the vehicle. Another advantageous embodiment of the system is characterized in that the selective opening initiates the opening of the vehicle doors. In an advantageous embodiment of the system according to the invention, the selective opening initiates the opening of the gas cap cover of the vehicle.

Another embodiment of the system is characterized in that an encryptor is provided for encrypting the communication between the communication device of the system and the communication device of the access arrangement by the use of a shared secret.

Advantageously, the invention provides a reliable and secure possibility for granting the service provider access to the vehicle while not critically endangering anti-theft protection.

According to an aspect of the invention, a rolling code method is used, which can be used only by the service provider in one window of time and which expires after the single use. The vehicle must receive the rolling code from the driver, wherein the rolling code originates from the service in a verified manner, e.g., via manual entry or transmitted by a cellular telephone over a secure channel.

Advantageously, the vehicle can be left on public parking lots of shopping centers or companies. The service provider receives the access code from the driver and can perform the requested maintenance, cleaning, or other services. For example, the vehicle is cleaned on the inside and outside while the driver is shopping. The workshop can repair the vehicle or install winter tires on-site, wherein these winter tires are stored in the workshop, and valet refueling services, battery inspection or replacement when the vehicle is left for a relatively long period of time during vacation, or in the case of vehicle fleets can be successfully carried out. Recall actions by the OEMs, such as SW updates, can be carried out more easily using the system according to the invention.

According to an aspect of the invention, the vehicle can inform the driver or a parking garage management system as to when and where the vehicle is parked, in order to permit the service work to be carried out on-site. The closing devices can be opened using the special rolling code that was individually negotiated.

According to an aspect of the invention, a calendar function, which is located in the vehicle and is integrated in a driver assistance system, is used to schedule the maintenance appointments on the basis of the vehicle sensor system, vehicle diagnostics, the weather, or recall or maintenance actions authorized by the OEM in order to autonomously contact the workshop or a service provider, wherein it is possible for the driver to intervene.

Moreover, according to an aspect of the invention, the driver or one of the passengers is made aware that the service was carried out by a signal when the driver or one of the passengers enters or exits the vehicle. The indication is carried out, for example, by signaling via driver assistance systems, which can issue a warning to the driver or the passengers. The signal includes the notification that a certain service was carried out on the vehicle.

Driver assistance systems are electronic auxiliary devices in vehicles, which support the driver in certain driving situations. Safety aspects are often the primary concern in this case, although increasing driving comfort is also a main objective.

These systems intervene, semi-autonomously or autonomously, in the drive, control, e.g., gas, brakes or signaling devices of the vehicle, or warn the driver, via suitable human-machine interfaces, shortly before or during critical situations. Such driver assistance systems are, for example, parking assistance (sensor arrays for obstacle and distance detection), braking assistance system (BAS), vehicle-speed controller, adaptive cruise control (ACC), proximity warning device, cornering assistance, traffic congestion assistance, lane detection system, lane keeping assistance/lane assistance, transverse guidance support, lane departure warning (LDW), lane keeping support, lane change assistance, lane change support, intelligent speed adaption (ISA), adaptive cornering light, tire pressure monitoring system, driver state detection, traffic sign detection, platooning, automatic emergency braking (AEB), high-beam and low-beam assistance for driving light, night vision.

A preferred embodiment of the system for the selective opening of a vehicle is characterized in that this system comprises a first communications module for establishing a communication link to a communication terminal unit of a service provider of the authorization data via a communications network, a first identification routine for the unambiguous identification of the service provider, a second communications module for establishing a communication link via a wireless communications network to a communication device of a control device for the access arrangement of a vehicle, a second identification routine for the unambiguous identification of the system by the access arrangement, a third communications module for receiving update request information from the driver, and an updating routine for updating authorization data in a memory.

In an advantageous embodiment of the system, the wireless communications network is a mobile radio communications network. In another particularly advantageous embodiment of the system, means are provided for identifying the user by voice recognition, by transmission of identification information—PIN/TAN —, or by a challenge-response method.

Another advantageous embodiment of the system according to the invention is characterized in that, after execution of the updating routine for updating authorization data via a wireless communications network, the system transmits information about the service that was carried out and the type of service to the communication device of the control device for the access arrangement of the vehicle, wherein the control device for the access arrangement of the vehicle transmits a message about the delivery that was carried out, via a bus system in the vehicle, to a driver assistance system, and the driver assistance system displays a warning message about the service via a human-machine interface.

Another advantageous embodiment of the system according to the invention is characterized in that the bus system in the vehicle is a CAN bus.

Another advantageous embodiment of the system according to the invention is characterized in that the bus system in the vehicle is an Ethernet.

Another embodiment is characterized in that the service provider is identified by the use of unambiguous cryptographic information.

A particularly advantageous embodiment of the system comprises establishing a communication link via the wireless communications network by a mobile radio communications network and/or WLAN network, which can also be cited as vehicle-to-vehicle or vehicle-to-infrastructure communication.

In another highly secure embodiment, an encryptor provided for encrypting the communication between the communication device of the system and the communication device of the access arrangement by the use of a shared secret.

In another embodiment of the system according to the invention, registration of the vehicle is carried out as a first step. Next, the position of the vehicle is determined, whereupon a position of the parked vehicle is released, as a service address, to the system via a communication device by a communications network. The position of the parked vehicle is transmitted via a communication unit by a communications network. In addition, the authorization release to open at least one door and/or a trunk of the vehicle by a service employee is transmitted via a communication device of the system to a communication terminal unit of the service employee, wherein the opening is valid within a certain window of time. This window of time is automatically determined on the basis of the service work to be carried out.

With the present authorization of the access arrangement, an opening of at least one door and/or a trunk and/or the engine hood and/or the gas cap cover of the vehicle is activated and, after the opening has taken place and the service work has been carried out by the service provider manually closing a door and/or the trunk and/or the gas cap cover and/or the engine hood of the vehicle, a confirmation of the transmission of the service carried out by the service provider to the communication terminal unit of the driver via the communication device via the communications network takes place by the system according to the invention. After an updating request has been transmitted by the communication device of the driver, authorization data are updated in the control device for the access arrangement.

In another advantageous embodiment, the notification regarding the service work can be carried out in that the vehicle transmits an SMS, e-mail, or another electronic communication to the driver regarding the successful service work, via the communication device and in the form of a data packet, to the communication terminal unit via the communications network within the predetermined window of time. When the driver opens the vehicle, he receives a short message via the access arrangement, which is presented in an acoustic or visual manner on the monitor of the communication terminal unit, indicating that service work, such as an oil change, was carried out. According to the invention, when notification is provided that a service has been carried out, a warning is output when the driver exits the vehicle if further actions should be considered by the driver, for example, such as, e.g., the nuts of the wheel rims should be tightened after approximately 50 km.

According to the invention, the service work is documented visually, acoustically, or by sensors using an onboard camera. This type of documentation also functions, simultaneously, as an identification unit, which can be used according to the invention to identify the completed service work. To this end, when the vehicle is opened, cameras located in the vehicle, which are installed in the vehicle for this or other purposes, take photographs or record videos and are triggered by the access arrangement. It is also intended for cameras to be installed in the trunk. Particularly advantageous is the use of cameras that are installed for blind spot detection, parking assistance, support for adaptive restraint systems, sleep warning systems, or other purposes, and which are activated by the access arrangement when the trunk, gas cap cover, engine hood, or doors are opened. The videos or photographs can prevent or clarify potential cases of misuse. Sensor values from acceleration sensors or so-called structure-borne sound sensors or microphone signals are also used in order to document that the message was transmitted.

In another advantageous embodiment, the position of at least one available parking space is calculated on the basis of vehicle-to-vehicle and/or vehicle-to-infrastructure communication proceeding from the current position of the vehicle and is transmitted to a navigation device of the vehicle. The navigation device can transmit the position to the system via the communication devices.

Another embodiment of the system according to the invention is characterized in that the position of the available parking space is transmitted to the navigation device when the vehicle is located in a previously defined area relative to the available parking space, preferably in the proximity of a barrier of a parking facility.

A highly advantageous embodiment is characterized in that, after the vehicle is parked in a selected available parking space, the position of the selected parking space is transmitted to a storage medium, which preferably can be transported by the driver, preferably a key of the vehicle and/or a cellular telephone of the driver, and/or a chip card, and is subsequently stored on the storage medium and is preferably also displayed.

An advantageous embodiment is characterized in that the navigation device or the storage medium transmits the position of the selected parking space to the system via a parking space management system of the parking facility.

In another embodiment, when the selected parking space is vacated, the position of the parking space, which is available once more, is transmitted to the system via the parking space management system of the parking facility.

In another advantageous embodiment, the position of the at least one available parking space is calculated on the basis of a measurement of a distance from at least one vehicle or at least one infrastructure element to other vehicles or to other infrastructure elements, which are disposed within a surrounding area having a predetermined radius around the vehicle that is searching for an available parking space.

An advantageous embodiment is characterized in that additional information on the parking-space situation, preferably related to resident parking zones or no-stopping zones, is transmitted by the at least one infrastructure element and/or is provided by a digital map in the navigation device and is used to calculate the position of the at least one available parking space.

In another embodiment, the service provider is identified by voice recognition, by transmission of identification information—PIN/TAN —, or by a challenge-response method.

Another embodiment is characterized in that the system is identified by the use of unambiguous cryptographic information.

In another particularly advantageous embodiment, the communication link is established via the wireless communications network by a mobile radio communications network and/or WLAN network.

In another advantageous embodiment, the communication between the communication device of the system and the communication device of the access arrangement and the communication device of the service provider is encrypted by the use of a shared secret.

An advantage of the system according to the invention is that, by management of resident locations of the vehicles to be found, logistic synergy effects are generated since there is a high degree of vehicle automation for carrying out service work for the relevant vehicles.

Another aspect of the invention is that a communication link is established between a service provider, which receives the corresponding authorization data from the system according to the invention, and the access device of the vehicle. If the system or the mobile terminal unit of the service provider was successfully identified, the authorization data are updated in the control device for the access arrangement for the transmission procedure of the service provider and are activated accordingly such that the service, e.g., in the trunk or in the passenger compartment, is approved for the service provider by means of the authorized permission to open the vehicle doors or the tailgate of the trunk by the control device. The control device is usually located in the rear region, although some vehicle types have the control device in the front. In the field of automotive technology, the passenger compartment refers to the space in which the vehicle occupants are located.

In addition, the system can be carried out in a fully automated manner, i.e., quickly and without the cost-generating use of personnel, after initiation of the system by the driver. Costs are also reduced by the use of an existing mobile radio infrastructure and the possibility of realizing this largely by commercial server components. The automation also minimizes the risk of invalid inputs.

Another advantage of the invention is the possibility that the authorization data can be updated directly by a mobile terminal unit of the driver and of the service provider.

The vehicle according to the invention offers a reliable and secure possibility for a service provider to open the trunk, for example, while not critically endangering anti-theft protection as a result. A rolling code method can be used, which can be used only by the service provider one time only within a window of time and which expires after a single use.

The vehicle or the driver communicate their presence, via communication links, in an infrastructure unit connected to the system according to the invention, such as, e.g., a parking garage management system, wherein, via this communication, the system according to the invention is notified as to when and where the vehicle is parked, thereby making it possible to receive a message via a service provider. It is hereby advantageously ensured via the infrastructure and the thusly established information service that the deliveries can be transmitted by the delivery service in an optimized manner by means of optimized bundling of messages.

By the transmission of the authorization to open the relevant vehicle, it is also intended that, when the authorization is transmitted from the mobile terminal unit of the service provider or from the service vehicle networked therewith, all vehicles in the vicinity that expect service work respond to the radio signal generated by the service provider with a light signal. This makes it easier for the service provider to quickly locate the relevant vehicles, wherein, as previously mentioned, only the special individual rolling code must be used to open the trunk or the doors.

Further advantageous developments of the method according to the invention and the system for transmitting messages are found in the further claims.

BRIEF DESCRIPTION OF THE DRAWINGS

The system according to the invention is described in greater detail in relation to the drawings, in which.

DETAILED DESCRIPTION OF THE PRESENTLY PREFERRED EMBODIMENTS

Figure 1:
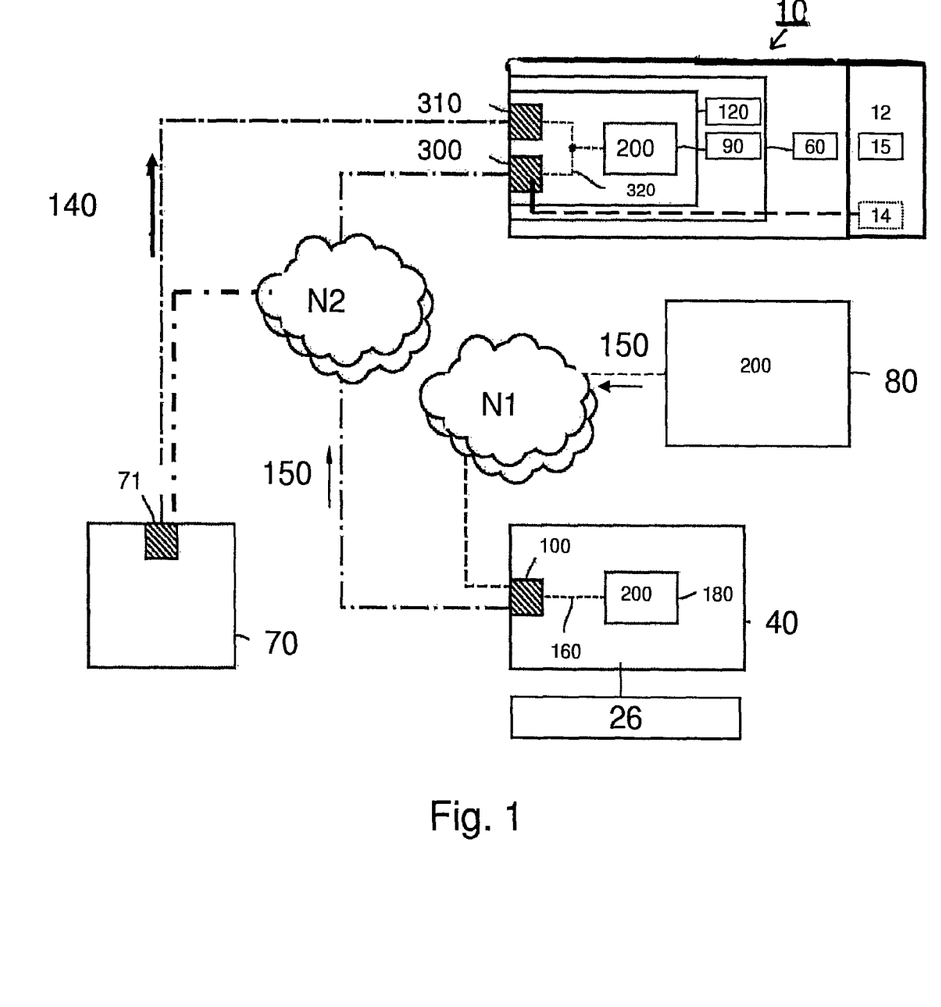
FIG. 1 shows a vehicle with a communication apparatus and a schematic illustration of an arrangement for implementing the inventive method and system.

As shown in FIG. 1, a vehicle 10, e.g., a truck, which is intended to be parked in a parking space, is equipped with a navigation device 15 or a positioning system, e.g., a GPS system 12, which contains a computing device 14 and a navigation device 15. In order to make a vehicle accessible as a destination address for delivery services or for service work, the parking times and the parking locations—which are ascertained by the navigation device 15, before the route is started, in a manner that can be at least partially planned—and the likely parking times are indicated. If suitable, a desired delivery service or service can then be requested at the parking site via the navigation device 15 by the communication device, thereby enabling the delivery services or the service providers to logistically plan and bundle the deliveries or service work, respectively. In the most favorable case, a delivery service can make deliveries to a plurality of vehicles in company parking lots, commuter parking lots, and P+R parking lots. It is thereby advantageously possible to minimize the amount of effort expended and the associated environmental impact. A precondition therefor is that the parking location of the relevant vehicles has already been known to the delivery service for a while before the delivery is carried out. To this end, the vehicle manages not only the driving destinations for the trip, but also the planned and current parking locations and parking duration in the navigation device 15 of the vehicle 10 or in a similar infotainment system, which is referred to in the following only as a navigation device 15. For this purpose, the driver provides additional information that was previously irrelevant, such as, e.g., the amount of time he spends every day at the workplace. To this end, advantageously, the driver can partially couple his electronic calendar, which stores the appointments in Microsoft Outlook, Lotus Notes, Google Calendar or similar systems, to the vehicle via the navigation device 15. For this purpose, the vehicle is stored as a "resource" in the calendar and, by a data connection to the vehicle, the relevant data are exchanged between the vehicle and the electronic calendar by an Internet connection or a connection for synchronization with the mobile terminal unit of the driver and the navigation device. The vehicle can therefore autonomously exchange all important information with a delivery service, since the navigation device 15 assumes the control for this purpose in order to establish the communication link.

As an alternative, the navigation device 15 can reach a parking time management, as a central on-line service for vehicles that are accessible via an Internet connection, via the communication link. In this alternative, the navigation device 15 provides a user interface for certain data and can combine the route planning with a connection to the parking time information. The navigation device 15 can report the transpired parking times to the control center and thereby support additional functions.

In the embodiment, parking fees can be paid automatically, in the above-described manner, via on-line settlement without any particular effort by the driver. In addition, parking spaces can be reserved during the trip itself, thereby making it possible to plan, nearly in real time, the logistics for the services to be provided.

In an alternative embodiment, in the case of vehicles having a partially electric drive, a preliminary reservation of charging infrastructure units is made, for example, even before the parking lot is reached. When implemented with full coverage, parking space utilization can be optimized and planned, which makes a substantial contribution to an overall ecological benefit. It is therefore possible, as a side effect, to optimize the driving strategy of vehicles having an electric and hybrid drive in that, when the future parking duration is known and provided there is access to the charging infrastructure, a decision can be made automatically, even during the trip itself, as to whether the vehicle is expected to reach the closest possible parking location with a dead battery or, if there are no charging possibilities, if said vehicle will reach the nearest possible parking location with a partially charged battery. In this case, these are vehicles that can be charged with a range extender or with an internal combustion engine in the drive train, or can at least influence the discharging of the battery.

By the aforementioned route planning, the financial institution can also function as the service provider, since the accounting of trips is mechanically supported and the exact distance and times are documented.

By the aforementioned route planning with the navigation device and the establishment of the communication link, thermal preconditioning of vehicles can be adjusted in accordance with the planned trips without the need for the driver to repeatedly activate the function via remote control or on-line access. For example, electric vehicles and plug-in vehicles can be preconditioned in a timely manner by the charging infrastructure itself, thereby making it possible to extend the purely electric range.

The decisive advantage is that the vehicle can be used as a delivery address, thereby optimizing the logistical effort and the environmental impact of the delivery services. By interlinking the navigation device and the driver's calendar, the driver is relieved and does not have to repeatedly manually enter the parking locations for deliveries. The decisive points in this regard are that the navigation device in the vehicle manages not only the driving times and routes, but also the parking location and parking duration, even for the near future.

Subsequent thereto, an updating of authorization data 200 of an access arrangement 60 of the vehicle 12 and of authorization data 200 of a communication terminal unit 71 of the service provider 70 is carried out. The system 40 can be a server-based solution, which comprises the typical components and peripheral devices, such as processor, memory, network N1 connection, operating system, application software, etc. A first communications network and a second communications network N2 are also provided.

The communication terminal unit 71 of the service provider 70 is, e.g., a mobile radio terminal unit, a multifunctional smartphone, a chip card, or a similar terminal unit having wireless communication capacity and having a memory, which has at least one communication device. The system 40 comprises a communication device 100, by which the system 40 can communicate both with the communications network N1 and with the communications network N2. In addition, in the system 40, the communication device 100 is connected via a data bus 160 to a data module 180 with the use of relevant communication protocols. The authorization data 200 were originally issued or managed by this data module 180 or another competent device. The authorization data 200 also comprise the profiled authorization data. The communication terminal unit 80 of the driver is also wirelessly connected, for example, to the communications network N1.

The vehicle 10 has an access arrangement 60. This access arrangement 60 comprises a control device 120. This control device 120 is connected to the communications network N2 via a communication device 300. The authorization data 200 of authorized service providers of the access arrangement 60 are also stored in a memory 90 in the control device 120.

Vehicles are often equipped these days with so-called "keyless entry access units", which make it possible to wirelessly unlock and lock the vehicle from the outside. A control unit located in the motor vehicle is required for this purpose, the control unit communicating via radio signals with an external unit, which is usually integrated in a key or in an authorization card for the vehicle. The control unit located in the vehicle and the external unit, which is also referred to as an external identification unit, which the driver usually carries on his person, establish wireless contact with one another after both have been activated. The two units then wirelessly exchange data containing a stored code. If this code is the same between the identification unit and the control unit, the vehicle is unlocked or locked by the authorized driver.

The mobile terminal unit or communication terminal unit of the service provider 70 having a communication device 71 is also depicted. By this mobile terminal unit, it is possible to transmit, via the communication device 71 thereof, a coded and encrypted radio signal 140 to a communication device 310 of the control device 120 for the access arrangement 60.

A radio signal is understood to be a communication signal based on electromagnetic signals, including optical signals (e.g., infrared light). The vehicle 10 reacts to a certain, encrypted radio signal 140 of the communication terminal unit 71 of the service provider 70, which is preferably limited to a certain window of time and is invalidated after the opening commands are used. The radio signal 140 provides access authorization, but does not provide driving authorization in order to start the vehicle. An active alarm system, which is not illustrated, is modified, according to the invention, for the period of time of the authorized duration of the service work on the vehicle such that an alarm is not triggered.

Various functions of the access arrangement 60 can be triggered by the radio signal 140. This can be, e.g., opening or closing the door lock or the trunk lock or the engine hood or the gas cap cover. In this connection, certain information is assigned to the communication terminal unit 71 of the service provider 70 and is stored, and certain user data 200 are assigned to the control device 120 and are stored, e.g., by the data module 180 of the system 40. These make it possible to operate the access arrangement 60 of a certain vehicle only by a certain communication terminal unit 71 of the service provider 70. The memory 90 and the communication devices 300 and 310 of the vehicle 10 are connected to one another via a data bus 320 with the use of relevant communication protocols.

Data packets are transmitted in the radio signal 140, which can comprise, as a first data element, a vehicle identification, the vehicle color, vehicle type, vehicle registration number, a digital identification code, and a number to call, and, as a second data element, the vehicle position or a URL for a service, such as an IP-based parking space management system 26, where the vehicle location can be called up, and, as a third data element, an access code, which permits profiled access for the service provider but also provides driving authorization and becomes invalid after a certain period of time. As an alternative, further data fields are occupied, such as "search code", "approval to open the door, engine hood, trunk, gas cap cover". The data packet also contains elements that refer to the characteristic of the service that was carried out.

The communication terminal unit 80 of the driver, which is also a cellular telephone, smartphone, a multifunctional vehicle key, or a chip card, contains a certain number of access codes 200 or receives these from the vehicle 10 via the system 40.

In this variant of providing authorization, the vehicle does not necessarily need to be directly networked with the surroundings. The access codes prepared in the communication terminal unit of the driver become valid when the driver exits the vehicle, in that the time period of the point when the driver exits the vehicle+X hours is determined, wherein X hours is the length of time the vehicle is left in the parking lot for the duration of the service.

After the authorized service provider has been unambiguously identified, the authorization data 200 will then establish a communication link from the communication device 100 of the system 40 to the communication device 300 of the control device 120 for the access arrangement 60 by the communications network N2.

The communication terminal unit 71 of the service provider 70 is then unambiguously identified by the control device 120 for the access arrangement 60. This can take place, e.g., by the use of an unambiguous cryptographic key. In this connection, it is not necessary for this step to take place directly after the service provider has been identified and the update request has been specified.

One possibility for identifying or authenticating the communication terminal unit 71 of the service provider 70 by the control device 120 for the access arrangement 60 is a challenge/response method, for example. A prerequisite therefor is that the control device for the access arrangement and the communication terminal unit 71 of the service provider have a shared cryptographic secret. This secret is expediently generated the first time the driver logs on or is registered with the system 40, either by the control device 120 for the access arrangement 60 or by the system 40. The secret is then stored in the memory 90 in the control device 120 and in the system. After communication is established between the communication terminal unit 71 of the service provider 70 and the control device 120 via the communications network N2, the control device will transmit a query—challenge—to the system 40 and the communication terminal unit 71 of the service provider 70, on the basis of which the system and the communication terminal unit of the service provider calculate the response by the cryptographic secret and transmit this response back to the control device 120 for the access arrangement 60 by the communications network N2. This method also has the advantage that the subsequent further communication between the system 40, the communication terminal unit 71 of the service provider 70, and the control device 120 can also take place in an encrypted manner via the communications network for transmitting the update request with the use of the shared secret and, therefore, it is not required that the protocols per se, which run via the communications network, provide sufficient data security.

The simpler method for the identification or authentication of the system by the control device 120 for the access arrangement 60 is the use of a PIN code, optionally together with a single-use TAN code. These codes, i.e., PIN and, optionally, a sufficient quantity of TAN codes, are expediently generated the first time the driver logs on/registers with the system 40, either by the control device 120 for the access arrangement 60 or by the system 40, and are stored in the memory 90 of the control device 120 and in the system 40. The communication takes place in an unencrypted manner here, and a prerequisite therefor is that the protocols running via the communications network provide sufficient data security.

As an alternative, the radio signal 140 can be divided between the communication terminal unit 80 of the driver and the communication terminal unit 71 of the service provider 70 such that the data packets transmitted between the driver and the supplier in the access arrangement 60 such that the data packet is transmitted partially by the driver via cellular telephone or e-mail or a comparable technology, is partially stored with the service provider 70, and the two subpackets only jointly provide an access code or authorization data 200. This method advantageously prevents an access code from being tapped during transmission and prevents the vehicle from being opened without authorization.

In a variant of this method, the system 40 itself does not store any identification data. Instead, after the communication has been established between the system 40 and the control device 120, the system 40 transmits the identification data of the service provider to the control device 120.

In this case, the identification data (e.g., PIN code or TAN codes) are stored in the memory 90 of the control device 120. These data are also known to the service provider or are stored, e.g., in a memory in the communication terminal unit 71 of the service provider 70.

After the system 40 has been unambiguously identified with respect to the control device, the update request from the driver is transmitted from the communication device 100 of the system 40 via the communications network N2 to the communication device 300 of the control device 120. The authorization data 200 are then updated in the memory 90 of the control device 120 for the access arrangement 60 in accordance with the update request.

Another example is used to explain how the position can be determined in the downtown region of large cities for indicating the service location.

Several vehicles, which are of the same model and have the above-described functionalities, are parked on the edge of the road.

In order to realize the system according to the invention, it is advantageous when the vehicles comprise distance sensors, which are mounted on the front, rear, or the sides of the participating vehicles, such as, e.g., ultrasonic sensors, infrared sensors, radar sensors, camera, etc. By the computing unit 14, the vehicles can furthermore carry out vehicle-to-vehicle communication and/or vehicle-to-infrastructure communication via the communication devices. A navigation device 15 is also provided.

While searching for a parking space, the driver of the searching vehicle first establishes a connection to vehicles in a surrounding area having a previously defined radius around the vehicle by a button or a command. As a result, the vehicles already parked in the surrounding area are "awakened" from a so-called sleep mode (inactive state) and are switched to the active state. The vehicles that are now in the active state then measure their distances from the respectively closest vehicle or the closest infrastructure device, e.g., a traffic light or a traffic sign, toward the front, the rear, and/or the sides.

The ascertained distance data are transmitted by the vehicles in the surrounding area, by vehicle-to-vehicle communication, to the computing device 14 of the vehicle searching for a parking space.

Furthermore, the positions of the respective vehicles are transmitted to the computing device 14 of this vehicle. The computing device 14 of the GPS system 12 can then determine the surface area that is respectively available for parking on the basis of the information transmitted via C2C communication. If this is sufficiently large, the corresponding available space is identified as a parking space and is displayed to the driver as a parking space that is available for parking. After the vehicle 10 has taken this parking space, this position is transmitted from the GPS system to the system via the communication device.

On the basis of the data determined by the computing device 14, the navigation device 15 can calculate the route from the current position of the vehicle searching for a parking space to the available parking space and can make this available to the driver to permit rapid location of the parking space. If there are several available parking spaces in the surrounding area of the vehicle, these can be shown in a display of the computing device, thereby enabling the driver to select a parking space that he finds suitable.

According to the invention, the authorized service provider 70 can also update the authorization data 200 of the access arrangement 60 without assistance from a service center. To this end, a connection is first established from the mobile radio terminal unit 71 of the authorized service provider 70 to the communication device of the access arrangement 60 via the mobile radio communications network. The authorized service provider 70 is then unambiguously identified. This can take place in various ways. According to the invention, the control device 120 can generate an authorization code and transmit this via the communication device, e.g., as a short message—SMS—to the mobile radio terminal unit of the authorized service provider 70. This authorization code is stored in the mobile radio terminal unit in a memory or on the SIM card thereof. In the event that updating of the user data is desired, this vehicle authorization code must be returned to the communication device. According to the invention, two-part identification can then take place. To this end, a check is initially carried out to determine whether the authorization code was sent by a known mobile radio terminal unit or the SIM card thereof. If this is the case, in a second step, the authorization code sent by the mobile radio device is then checked by the control device for the access arrangement. If this check is positive, the authorization data in the control device are updated in accordance with the request, e.g., are deleted.

This method for the identification of the service provider can also be secured even further in that, after receiving the vehicle authorization code, the communication device of the control device transmits a query, e.g., as a short message—SMS—to an address (telephone number) of a mobile radio device that was previously stored in the control device or in the communication device of the control device, which address must then be confirmed within a window of time, e.g., again by means of a short message having a vehicle authorization code to the communication device of the control device. At this point, the information describing the type of service provider is also transmitted. The type of service work can also be indicated by means of the identification.

Another possible identification method is the use of a challenge-response method described above in detail, wherein a shared secret is exchanged, in advance, between the control device for the access arrangement and the mobile radio terminal unit of 71 the service provider or the SIM card thereof. In this case, the mobile radio terminal unit of the service provider 70 must be authenticated with respect to the access arrangement 60.

The use of the above-described method is advantageous not only for deleting user data in the memory, but also for reactivating user data.

According to the invention, the described system can also be adapted for use on RKE (remote keyless entry) keys or vehicle immobilizers.

Figure 2:
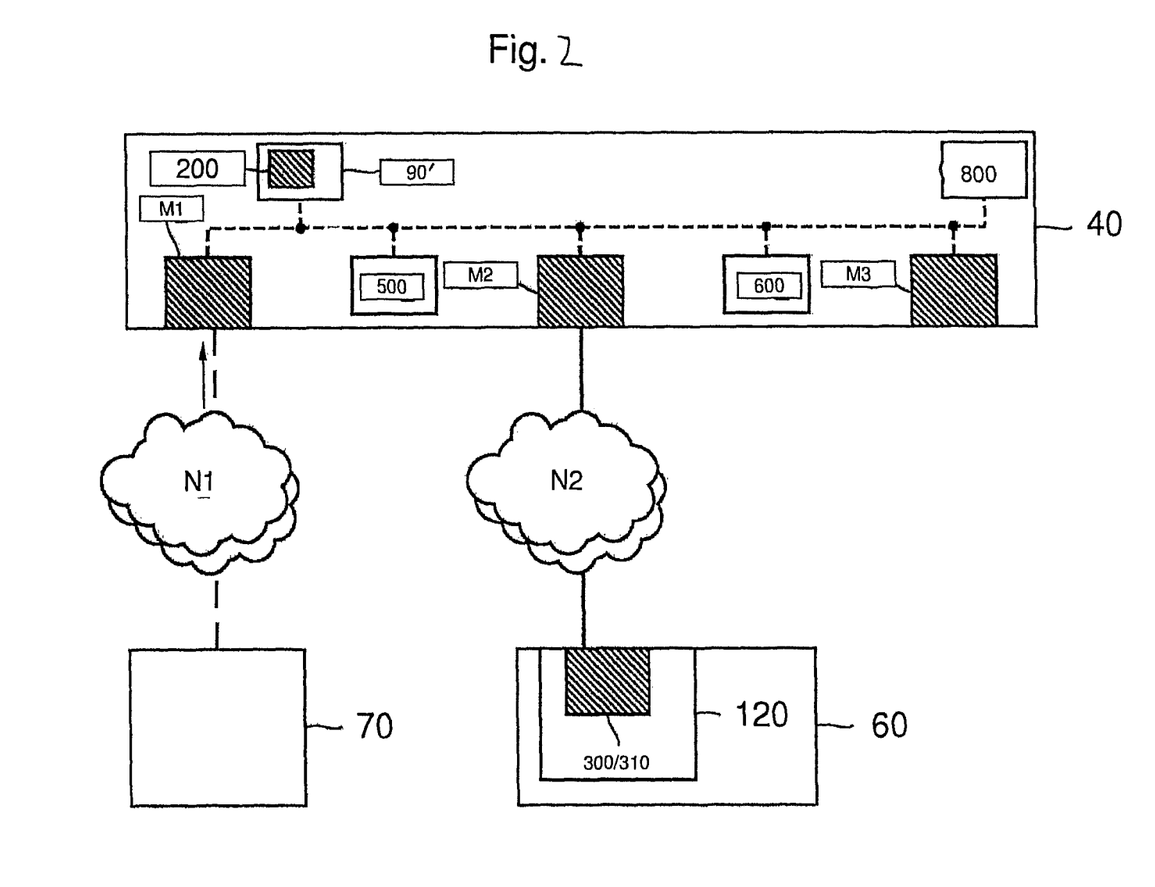
FIG. 2 shows a schematic illustration of an arrangement for implementing the inventive system.

FIG. 2 schematically shows a preferred embodiment of the system for the selective opening of a vehicle. The system has a first communications module M1 configured to establish a communication link to a communication terminal unit of a service provider 70 of the authorization data 200 via a communications network N1. A first identification routine 500 provides for the unambiguous identification of the service provider 70. A second communications module M2 is configured to establish a communication link via a wireless communications network N2 to a communication device 300/310 of a control device 120 for the access arrangement 60 of a vehicle 10. A second identification routine 600 provides for the unambiguous identification of the system 40 by the access arrangement 60. A third communications module M3 receives update request information from the driver. An updating routine 800 updates authorization data 200 in a memory 90'.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for the parking time management of a vehicle, comprising a first communication module that establishes a communication link to a communication terminal of a service provider of authorization data via a communication network;
    a first identification module that executes a first identification routine that unambiguously identifies a service provider;
    a second communication module that establishes a communication link via a wireless communication network to a communication device of a control device of an access arrangement of a vehicle;
    a second identification module that executes a second identification routine that unambiguously identifies the system by the access arrangement;
    a third communications module that receives an update request information item from the driver; and
    an update module that executes an update routine that updates authorization data in a memory of the system,
    wherein the communication link to the service provider is established via the second communications module using a navigation device located in the vehicle,
    wherein the establishment of the communication link is controlled by the navigation device, and a route plan stored by the driver in the navigation device in the vehicle is transmitted to the service provider via the communication link, and
    wherein the system, based on the route plan, adjusts thermal preconditioning of the vehicle by a charging infrastructure of the vehicle, to extend a purely electric range of the vehicle.

2. The system as claimed in claim 1, wherein plural navigation devices are integrated in a driver assistance system.

3. The system as claimed in claim 1, wherein the navigation device is a mobile navigation device, which controls the second communications module via near field communication.

4. The system as claimed in claim 1, wherein the communication link via the wireless communications network is established by a mobile radio communications network and/or WLAN network.

5. The system as claimed in claim 1, wherein, in the route planning, the navigation device determines dwell time in parking spaces in advance by a query routine and, if the dwell time is suitable, activation takes place to establish a communication link.

6. The system as claimed in claim 1, wherein the communication between the system and the navigation system is encrypted using a shared secret.

* * * * *